United States Patent

Clark

[11] 4,052,815
[45] Oct. 11, 1977

[54] MIST SHIELD FOR HOUSE PLANTS

[76] Inventor: Karen Clark, 18037 Torrence Ave., Lansing, Ill. 60438

[21] Appl. No.: 662,225

[22] Filed: Feb. 27, 1976

[51] Int. Cl.² ............ A01G 25/00; A01G 25/14; A01G 1/00
[52] U.S. Cl. ............ 47/1 R; 4/110; 47/26; 126/299 C; 220/1 R; 220/94 R; 220/DIG. 13; 239/122
[58] Field of Search ............ 239/104, 105, 121, 122; 47/1, 1.7, 26; 220/DIG. 13, 1 R, 94 R; 222/108; D29/28 R; 4/110; 141/97; 126/299 C

[56] References Cited

U.S. PATENT DOCUMENTS

| 189,653 | 4/1877 | Pudigon | 47/26 |
|---|---|---|---|
| 661,403 | 11/1900 | Hogan | 4/110 |
| 1,416,065 | 5/1922 | Rhodes | 239/121 |
| 1,650,739 | 11/1927 | Ridler | 239/121 X |
| 1,722,513 | 7/1929 | Witter | 126/299 C |
| 1,989,574 | 1/1935 | Roosendale | 220/1 R |
| 2,592,040 | 4/1952 | La Hue | 4/110 |
| 3,584,787 | 6/1971 | Thomason | 239/121 |
| 3,681,872 | 8/1972 | Leitch | 239/104 X |
| 3,701,558 | 10/1972 | Baker | 220/94 R X |
| D. 41,362 | 5/1911 | Ziegler | D29/28 R |
| D. 128,838 | 8/1941 | Weil | D29/28 R |

Primary Examiner—Edgar S. Burr
Assistant Examiner—Steven A. Bratlie
Attorney, Agent, or Firm—Sabin C. Bronson

[57] ABSTRACT

A shield, impervious to liquids, for use in positioning behind a plant while the plant is being sprayed with water for example, which shield is provided with a trough at its bottom edge to provide a retaining well, stiffen the shield, and provide weight for maintaining the same upright. The plant may thus be watered, the leaves sprayed or washed, without damage to surrounding windows or furniture, as the trough gathers the excess water which runs down the shield and into the trough.

1 Claim, 5 Drawing Figures

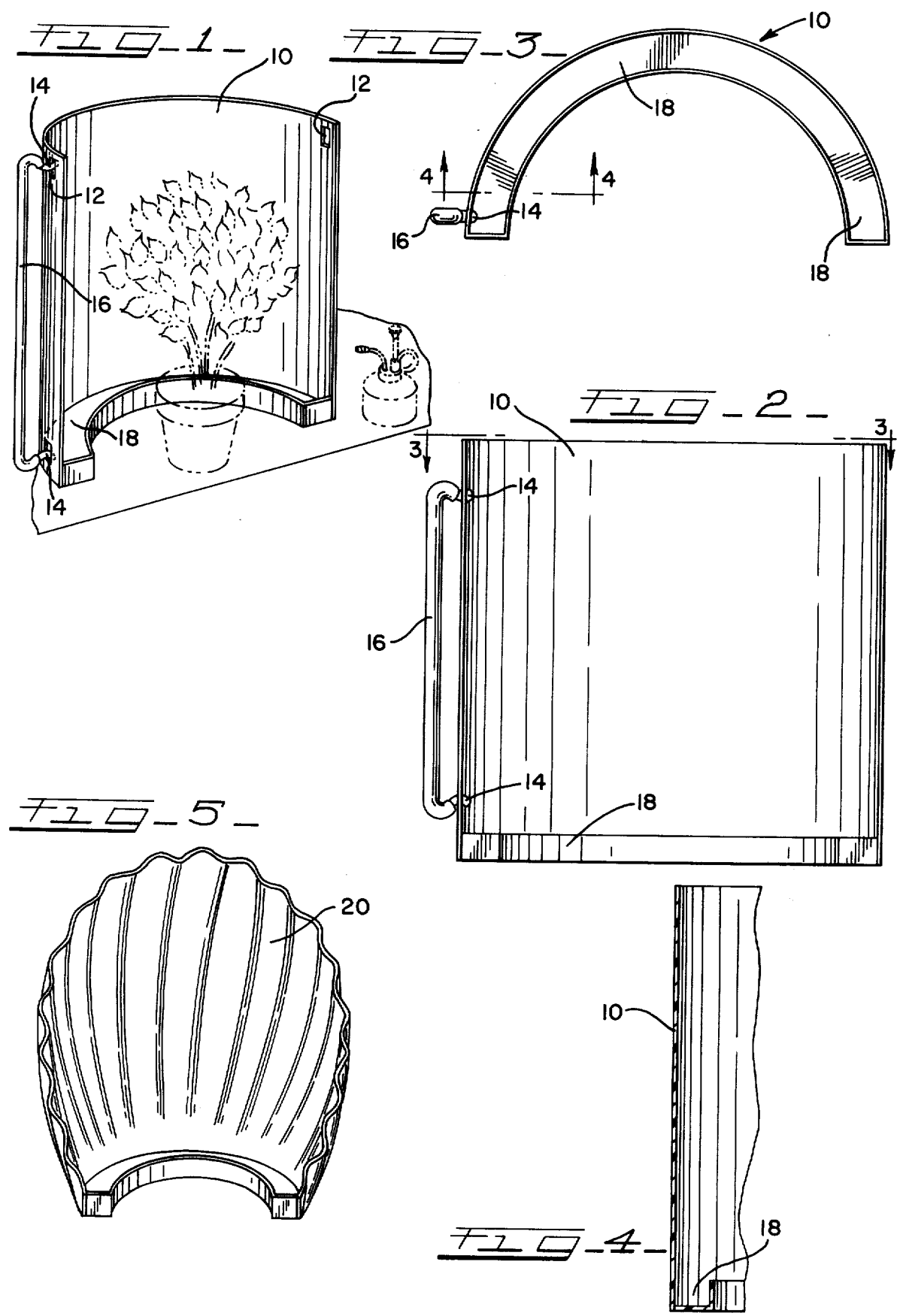

MIST SHIELD FOR HOUSE PLANTS

BACKGROUND AND SUMMARY OF THE INVENTION

This invention was developed for use with house plants, natural or artificial, which obviously over a period of time collect dust or refuse on the plant leaves, which interfere with the plant breathing or at least impairs the normal functioning of the plant. Unless the plant is cleaned on a regular basis the plant will deteriorate.

If space on a window sill is available, house plants are kept on said sills to have the advantage of sunshine when available. Watering or spraying a plant in such locations always sprays as much water on the window sill as on the plant. Further, there is a mopping up job to do on the window sill, as well as to wash the window of the spray which missed the plant.

To relieve all of this work after the spray job is done, I have provided a semi-cylindrical mist shield or guard to place behind the plant at least when spraying the same. A trough is provided about the base of the shield to catch water which passed through the plant onto the shield. It then runs down into the trough and may be poured therefrom directly into the pot in which the plant is growing.

Plant shower curtains have been provided for like purposes, for example see U.S. Pat. No. 3,681,872, which enclose the plant completely in the hollow cylindrical curtain of the invention. After showering or washing the plant in that curtain structure, the labor of mopping up must be done.

BRIEF DESCRIPTION OF THE DRAWINGS

Referring now to the accompanying drawings forming part of this application and wherein like reference characters indicate like parts:-

FIG. 1 is a perspective view of my invention showing in dotted lines a plant in a flower pot within my shield and ready to be sprayed.

FIG. 2 is a front elevation of my shield.

FIG. 3 is a top plan view of FIG. 2.

FIG. 4 is a section on the line 4—4 of FIG. 2.

FIG. 5 is a perspective view of a modified form of shield being shell-shaped and having a trough at the bottom thereof.

DESCRIPTION OF THE PREFERRED EMBODIMENT

Referring now to the drawings in detail, the numeral 10 indicates a semi-cylindrical shield of relatively thin plastic sheet material which may also be transparent if desired. Adjacent the upper and lower corners of the cylindrical portion 10 are openings 12 in which the curved ends 14 of the removable handle 16 is sprung in place, providing convenience for left or right handed persons, in holding the shield, for example, behind a hanging plant with one hand, while manipulating a sprayer with the other hand.

At the bottom of the shield is formed a trough 18 which extends about the shield, and is closed at its ends, to catch water from the spray which did not remain on the leaves of the plant during the spraying operation, and also provides a retaining well for the spray which deposits on the shield and runs down into the trough.

A modified form of the device is shown in FIG. 5 wherein the semi-cylindrical shield 20 is vertically corrugated or shell-like in appearance. This shield is also provided with a trough at its lower edge as in the outer figure. The water which drains down the shield thus collects in the trough and may be disposed of when necessary.

I have thus provided a relatively simple and attractive shield or guard to be placed behind a plant while washing or spraying the same to protect windows, curtains, sills, table tops, etc., from spray, during such operation, and convenient for either left or right handed persons to use.

I claim:

1. A plant mist shield or guard comprising a semi-cylindrical body portion of approximately 180° and open at the top, a trough, closed at its ends, provided and encompassed by the lower edge of said body portion, openings at the upper and lower corners of each end of said body portion, and a resilient handle having ends fitting the openings at either end of said body portion and which may be removably sprung into place in said openings, whereby said shield or guard may be manually placed or held behind a plant while misting or spraying the same, to catch any fluid which passes through the plant and deposits on the shield or guard, and runs down into the trough.

* * * * *